(12) United States Patent
Lee

(10) Patent No.: US 6,807,677 B1
(45) Date of Patent: Oct. 19, 2004

(54) TV PROGRAM USAGE INFORMATION SETTING METHOD AND APPARATUS USING THE SAME

(75) Inventor: Jae Kyung Lee, Daeku (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/212,575

(22) Filed: Dec. 16, 1998

(30) Foreign Application Priority Data

Dec. 17, 1997 (KR) .............................. 97-70083

(51) Int. Cl.[7] .......................... H04N 5/445; H04N 5/44
(52) U.S. Cl. ...................... 725/58; 348/553; 348/569; 348/563; 348/731; 725/9; 725/38; 725/46
(58) Field of Search ................................ 348/553, 563, 348/564, 565, 567, 460, 569, 731, 906, 732; 725/58, 9, 10, 39, 13, 40, 14, 29, 46, 38; 345/716, 719; 386/83; H04N 5/445

(56) References Cited

U.S. PATENT DOCUMENTS

| | | | |
|---|---|---|---|
| 4,847,696 A | * 7/1989 | Matsumoto et al. | 386/83 |
| 5,063,543 A | * 11/1991 | Shibuya et al. | 368/29 |
| 5,465,385 A | * 11/1995 | Ohga et al. | 725/58 |
| 5,532,761 A | * 7/1996 | Lee | 725/58 |
| 5,596,373 A | * 1/1997 | White et al. | 348/569 |
| 5,699,107 A | * 12/1997 | Lawler et al. | 348/13 |
| 5,721,593 A | * 2/1998 | Suh | 348/564 |
| 5,818,541 A | * 10/1998 | Matsuura et al. | 348/565 |
| 5,828,417 A | * 10/1998 | Itagaki et al. | 348/553 |
| 5,867,227 A | * 2/1999 | Yamaguchi | 348/564 |
| 5,880,768 A | * 3/1999 | Lemmons et al. | 348/1 |
| 5,959,688 A | * 9/1999 | Schein et al. | 725/49 |
| 5,969,767 A | * 10/1999 | Ishikawa et al. | 348/564 |
| 5,969,769 A | * 10/1999 | Hamadate | 348/568 |
| 6,128,009 A | * 10/2000 | Ohkura et al. | 725/46 |
| 6,141,003 A | * 10/2000 | Chor et al. | 345/719 |
| 6,177,931 B1 | * 1/2001 | Alexander et al. | 345/327 |
| 6,247,176 B1 | * 6/2001 | Schein et al. | 725/43 |
| 6,266,814 B1 | * 7/2001 | Lemmons et al. | 725/44 |
| 6,317,885 B1 | * 11/2001 | Fries | 725/109 |
| 6,331,877 B1 | * 12/2001 | Bennington et al. | 348/731 |
| 6,400,406 B1 | * 6/2002 | Kim | 348/460 |
| 6,526,577 B1 | * 2/2003 | Knudson et al. | 725/40 |
| 6,593,976 B1 | * 7/2003 | Lord | 348/731 |
| 6,642,939 B1 | * 11/2003 | Vallone et al. | 345/721 |
| 6,732,369 B1 | * 5/2004 | Schein et al. | 725/39 |

* cited by examiner

*Primary Examiner*—Michael H. Lee
*Assistant Examiner*—Jean W. Désir
(74) *Attorney, Agent, or Firm*—Fleshner & Kim, LLP

(57) ABSTRACT

A TV program usage information setting method and apparatus using the same which simply reserve information of a specific TV program which is periodically broadcasted on certain day and time and selectively or automatically receives and shows the TV program when it becomes the certain day and time which have been reserved. According to the present invention, usage information, such as broadcasting day and time, channel, volume and screen size, related to a specific TV program is stored by pressing a usage key when the specific TV program which is periodically or recurringly broadcasted is shown on a TV set, and the specific TV program is automatically and recurringly broadcasted in accordance with the stored usage information when the stored day and time are identical to the current day and time.

20 Claims, 11 Drawing Sheets

TV PROGRAM USAGE INFORMATION SETTING METHOD AND APPARATUS USING THE SAME

BACKGROUND OF THE INVENTION

1. Field of the Invention

The present invention relates to a TV program reserve setting method and an apparatus using the same that store TV program information of a show time in a TV set so as for the TV program to be automatically shown at the stored reserve time, and more particularly to a TV program usage information setting method and an apparatus using the same which simply reserve information of a specific TV program periodically and recurringly showed on a certain day and time and selectively or automatically tunes in and shows the TV program when occurs the certain day and time which have been reserved.

2. Description of the Conventional Art

FIG. 1 is a schematic block diagram of a conventional TV set which is controlled by a reserve setting method of a TV program. As shown therein, a microcomputer 6 which receives command signals generated by pressing a key matrix provided on a remote control (not shown) or on the TV set and which controls each unit of the TV set in accordance with the corresponding command signal, a main screen channel selecting unit 1 which receives a signal supplied from an antenna, selects a channel of a main screen and outputs image and sound signals corresponding to the selected channel, a sub screen channel selecting unit 2 which receives a signal supplied from the antenna, selects a channel of a sub screen and outputs image and sound signals corresponding to the selected channel, a picture in picture (PIP) processing unit 3 which synthesizes the image and speech signals outputted from the main and sub screen channel selecting units 1, 2, and an image signal processing unit 4 which processes the image signals supplied from the PIP processing unit 3 to be displayed on a cathode ray tube (CRT) display 5, in accordance with the control of the microcomputer 6.

Now, an operation of the conventional TV set controlled by the reserve setting method of the TV program will be described.

When a key of the key matrix provided on the remote control or on the TV set is pressed by the user and a PIP-functional command signal is transmitted to the microcomputer 6, the microcomputer 6 outputs tuning signals corresponding to each channel to the main and sub screen channel selecting units 1, 2. Then, in accordance with the main channel tuning signal, the main screen channel selecting unit 1 selects the main screen channel, receives a signal from the antenna and outputs a main screen image signal, and the sub screen channel selecting unit 2, in accordance with the sub screen channel tuning signal, selects the sub screen channel, receives a signal from the antenna and outputs a sub screen image signal. Further, the PIP processing unit 3 receives and synthesizes the main and sub screen image signals and outputs a synthesized signal to the image signal processing unit 4 which processes the image signal supplied from the PIP processing unit 3 to be properly displayed on the CRT display 5 and simultaneously outputs the main and sub screen image signals to the CRT display 5.

FIG. 2 is a flowchart illustrating the operation program of the TV set in which a TV program is reserved according to the conventional reserve setting method. The broadcasting process of the reserved TV program will be described with reference to FIG. 2.

First, the microcomputer 6 determines whether a predetermined TV program has been previously reserved by the user (ST1), and if it is determined that the program has been reserved, the microcomputer 6 compares the reserve time of the TV program with the current time (ST2), and if no program is reserved or the reserve time of the program is different from the current time, no signal is supplied from the microcomputer 6. When the reserve time is determined to be identical to the current time, the microcomputer 6 determines whether the TV set is on (ST3). If the TV set is on, the flow is directly transferred to a block ST5, and if the TV set is not switched on, the microcomputer 6 switches on the TV set (ST4) and the program flow is transferred to the block ST5. Then, the microcomputer 6 determines whether the TV channel being shown on the main screen is the channel which has been previously reserved by the user (ST5), and if the channel on the main screen is identical to the reserved channel, the predetermined TV program is shown and if not, the channel on the main screen is switched to the reserved channel (ST6) and thereby the predetermined TV program is shown.

However, according to the conventional reserve setting method for the TV program to receive and show a certain TV program, to reserve the desired TV program, the user has to separately set information thereof such as the day, the time, volume, display conditions, which causes the user inconvenience. In addition, since the user must reserve and set individual information of other TV programs which are periodically broadcasted, it requires unnecessary time and also inconveniences the user.

SUMMARY OF THE INVENTION

Accordingly, the present invention is directed to a TV program usage information setting method and an apparatus using the same which obviate the problems and disadvantages due to the conventional art.

An object of the present invention is to provide a TV program usage information setting method that simply sets and reserves usage information related to a specific TV program and habitually and automatically receives and shows the specific TV program according to the usage information.

Another object of the present invention is to provide a TV program usage information setting method that simply sets and reserves usage information related to a specific TV program and on-screen displays a message which asks whether a user wants to watch the previously reserved TV program before receiving and showing specific TV program in accordance with the usage information.

Still another object of the present invention is to provide an apparatus for setting usage information of a TV program that simply sets and reserves usage information related to a specific TV program and habitually and automatically receives and shows the specific TV program according to the usage information.

To achieve these and other advantages and in accordance with the purpose of the present invention, as embodied and broadly described, according to a first embodiment of the present invention, usage information, such as broadcasting day and time, a channel, volume and screen size, related to a predetermined TV program is reserved by pressing a usage key when the predetermined TV program which is periodically or habitually broadcasted is shown on a TV set, and the predetermined TV program is automatically and habitually received and shown in accordance with the stored usage information when the reserved day and time are identical to current day and time.

According to a second embodiment of the present invention, when a TV program is broadcasted, in accordance with the previously stored usage information, a message which asks whether a user wants watch a specific TV program is displayed on a main screen. When the user confirms the reception and showing of the specific TV program, the specific TV program is displayed on the main screen, while if the user decides not to watch the broadcasting thereof, the usage setting of the specific TV program is deleted, and when no execution command is inputted by the user, the specific TV program is displayed on the main screen after a predetermined time.

Further, according to a third embodiment of the present invention, when a TV program is broadcasted, in accordance with previously stored usage information, a message which asks whether a user wants watch a specific TV program is displayed on a main screen, the specific TV program being displayed on a sub screen. When the user confirms the reception and showing of the specific TV program, the specific TV program is displayed on the main screen, while if the user decides not to watch the broadcast thereof, the usage setting of the specific TV program is deleted, and when no execution command is inputted by the user, the specific TV program is displayed on the main screen after a predetermined time.

In addition, according to a fourth embodiment, to achieve the object of the present invention there is provided an apparatus for setting usage information of a TV program, includes: a usage key of a key matrix provided on a remote control or a TV set for storing usage information related to a specific TV program which is periodically or habitually broadcasted; a microcomputer for receiving a command signal corresponding to the usage key and controlling each unit of the TV set in accordance with the command signal; main and sub screen channel selecting units for receiving signals from an antenna and processing speech and image signals to be properly displayed on a cathode ray tube (CRT); a picture-in-picture (PIP) processing unit for receiving the image and speech signals supplied from the main and sub screen channel selecting units and performing a PIP process for the image and speech signals; an on-screen processing unit for processing the stored usage information; and an image signal processing unit for processing to output the image and speech signals outputted from the PIP processing unit to the CRT.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
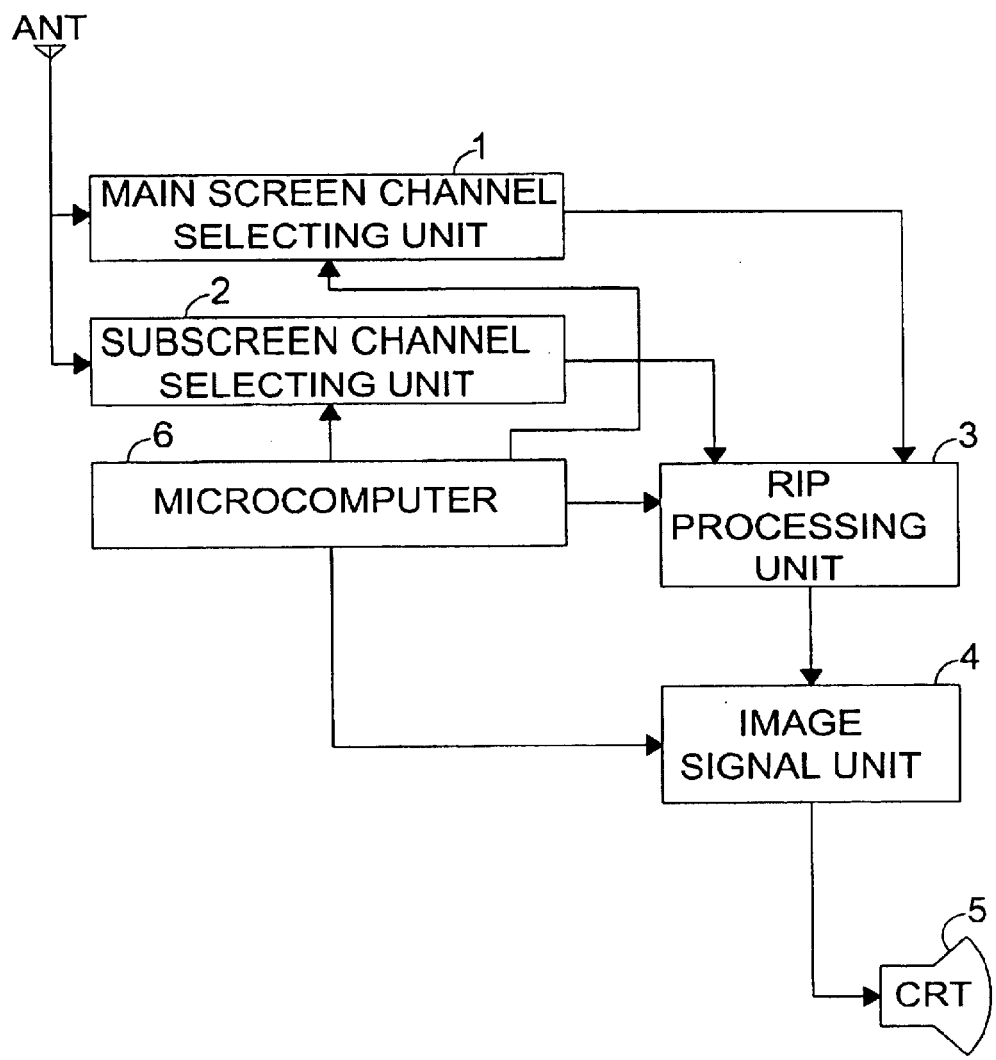
FIG. 1 is a schematic block diagram of a TV set controlled by a conventional reserve setting method of a TV program.
Figure 2:
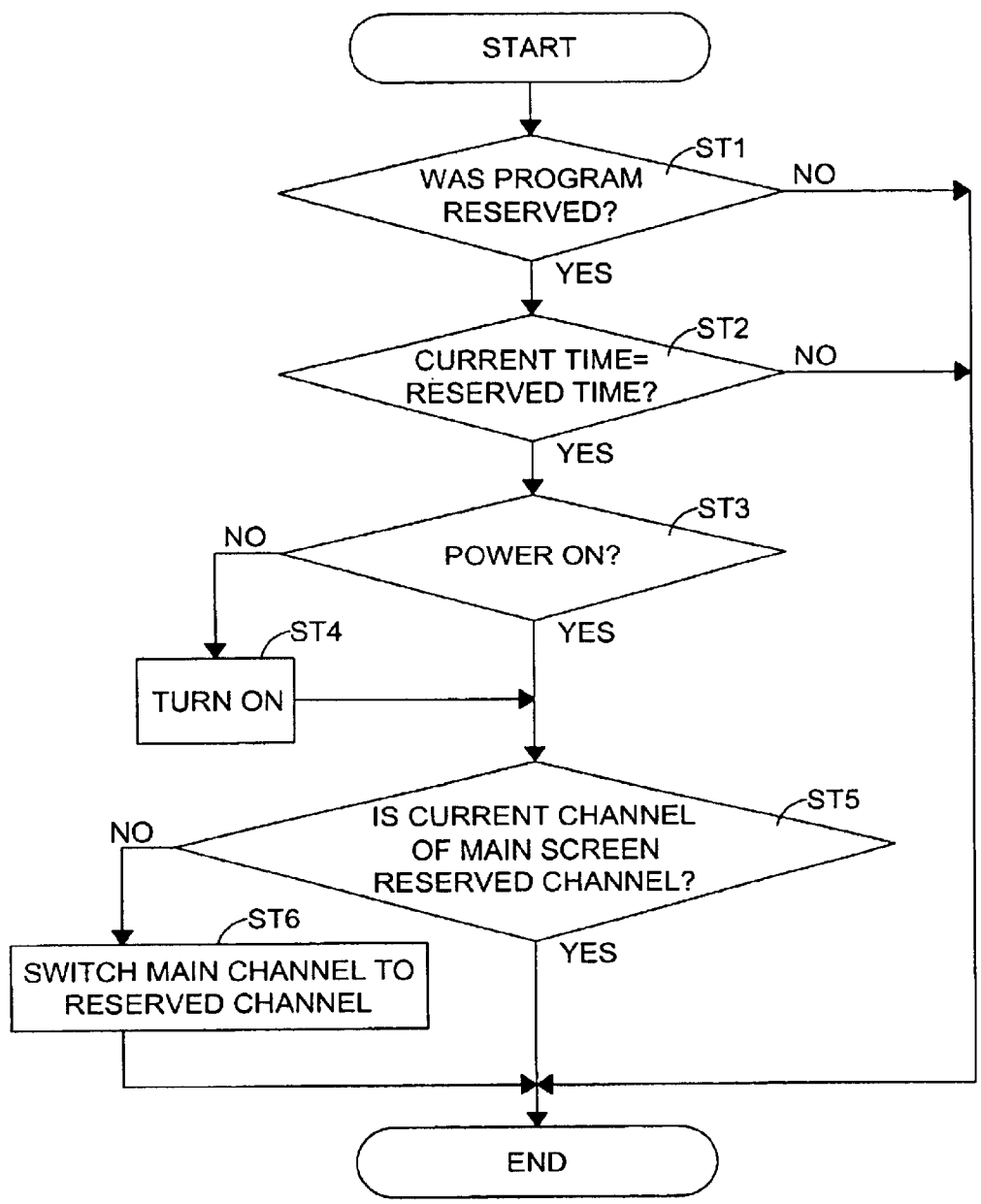
FIG. 2 is a flowchart illustrating the operation of the TV set in which a TV program is set and reserved according to the conventional reserve setting method.
Figure 3:
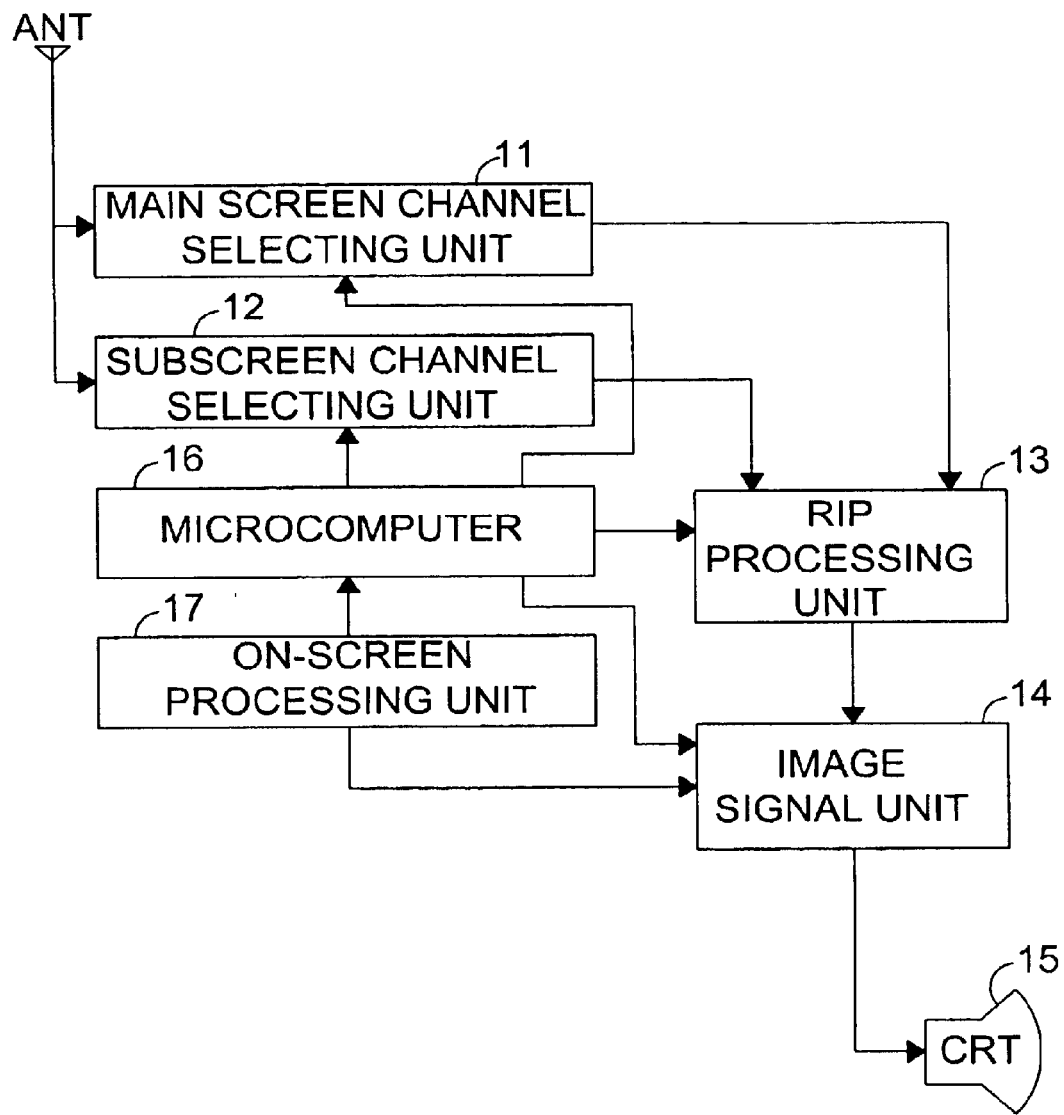
FIG. 3 is a schematic block diagram of a TV set controlled by a usage information setting method of a TV program according to the present invention.

FIG. 3 is a schematic block diagram of a TV set controlled by a usage setting method of a TV program according to the present invention. As shown therein, the TV set includes a microcomputer 16 receiving a command signal corresponding to the actuation of a usage key provided on a key matrix of a remote control (not shown) or on the TV set which is pressed by a user, and which controls each unit of the TV set in accordance with the command signal, a main screen channel selecting unit 11 which receives an RF composite image signal supplied from an antenna, selects a channel of a main screen and outputs image and sound signals of the corresponding channel, a sub screen channel selecting unit 12 which receives a signal supplied from the antenna, selects a channel of a sub screen and outputs image and sound signals of the corresponding channel, a PIP processing unit 13 which synthesizes the image and speech signals supplied from the main and sub screen channel selecting units 11, 12 and outputs a resultant signal, an on-screen processing unit 17 which processes reserved usage information, and an image signal processing unit 14 which processes the image and sound signals supplied from the PIP processing unit 13 and the processed usage information to be displayed on a CRT 15.

Now, a TV program usage setting and controlling method by using the thusly constructed TV set according to the present invention will be described with the accompanying drawings.

Figure 4:
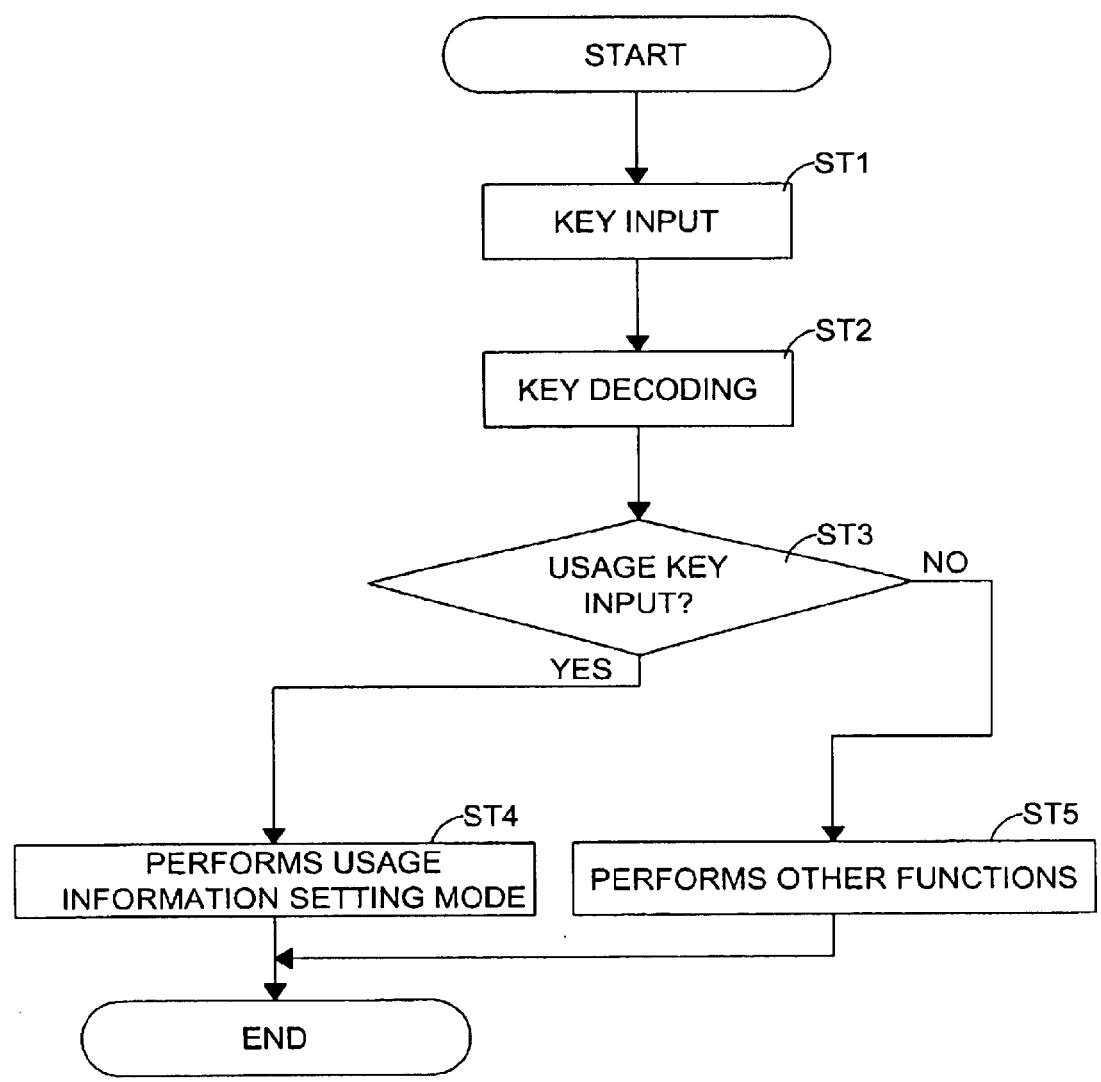
FIG. 4 is a flowchart illustrating the operation of a TV set in which a TV program is set and reserved according to the usage information setting method of the TV program according to the present invention.

FIG. 4 is a flowchart illustrating the operation of a TV set which determines whether usage information has been set in accordance with a key input. As shown therein, when a user actuates a predetermined key provided on the key matrix of the remote control or on the TV set (ST1), the microcomputer 16 decodes a signal corresponding to the actuated key (ST2) and determines whether the decoded signal corresponds to a usage key (ST3). When the decoded signal corresponds to the usage key, the microcomputer 16 executes a usage information setting mode as shown in FIG. 7 (ST4), and if not, the microcomputer 16 performs other functions which do not correspond to the usage key (ST5).

Figure 7:
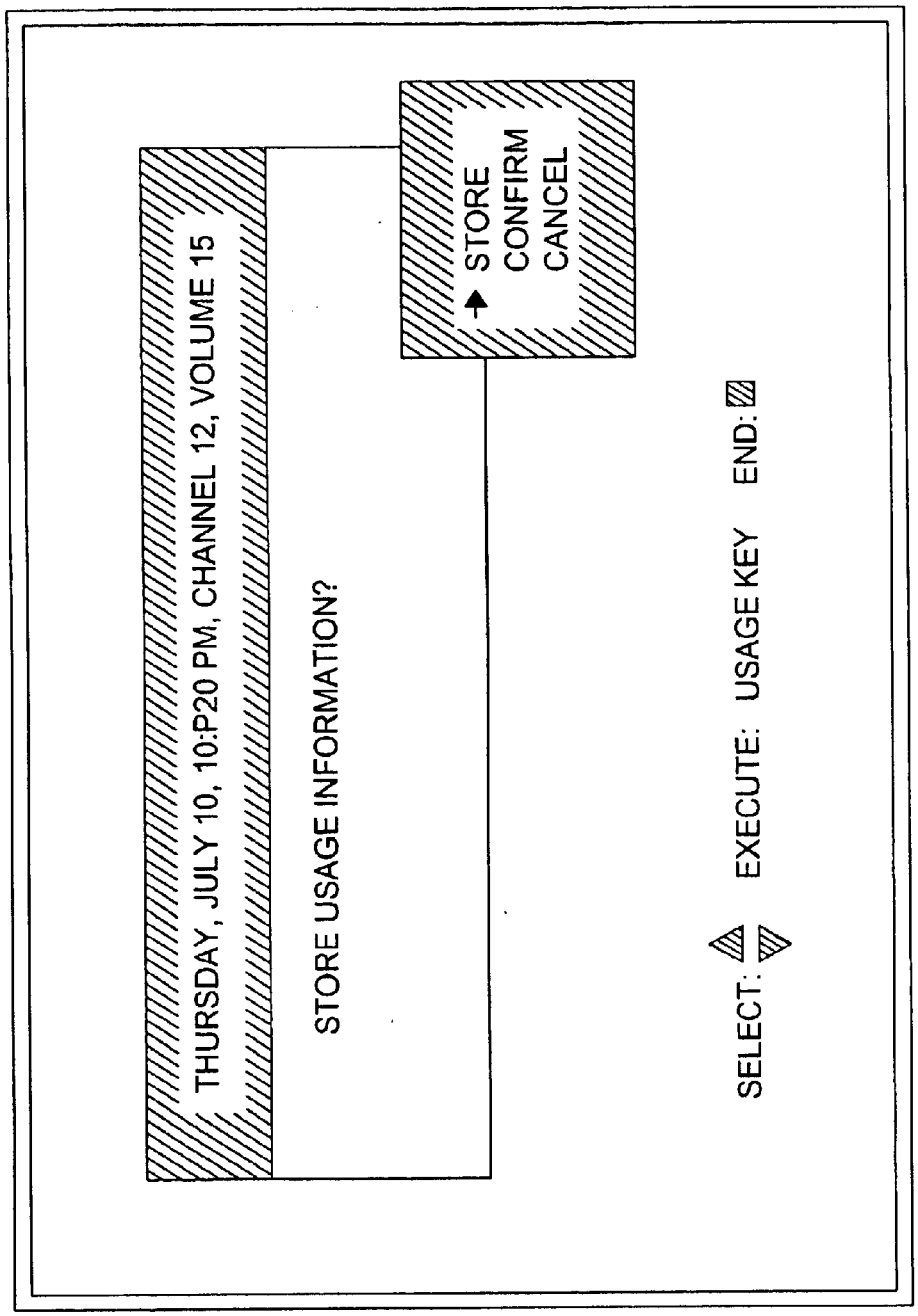
FIG. 7 is a diagram illustrating a menu on-screen displayed on a TV screen in the usage information setting mode.

More specifically, as shown in FIG. 7, the microcomputer 16 controls the image signal processing unit 14 and the on-screen processing unit 17 which processes the message "Store usage information ?" to be displayed on a main menu on-screen, and at the same time the microcomputer 16 controls the image signal processing unit 14 and the on-screen processing unit 17 which processes selection items-such as 'Store', 'Confirm', 'Cancel' to be displayed on a sub menu on the screen. Here, it is noted that the user selects a desired item with an arrow cursor by pressing an upward or downward selection key provided on the key matrix, and the item selected by the arrow cursor is distinguished from the other items by highlighting it in a specific color (for example, magenta or in reverse of the normal foreground and background colors), the other non-selected items being displayed in another color (for example, green or in the normal foreground/background colors). In such condition in which the item has been selected, when the user presses the usage key, the selected item is executed, while when an end key (for example, an enter key) is pressed, the screen is cleared for thereby completing the usage information setting mode.

It is noted that, in the on-screen displays depicted in each of FIG. 7 through 11, a relatively small window shown at an upper part thereof indicates on-screen information, and legends such as 'Select', 'Execute: usage key' and 'End' which are shown at a bottom part thereof correspond to predetermined keys provided on the key matrix of the remote control or the TV set.

Figure 5:
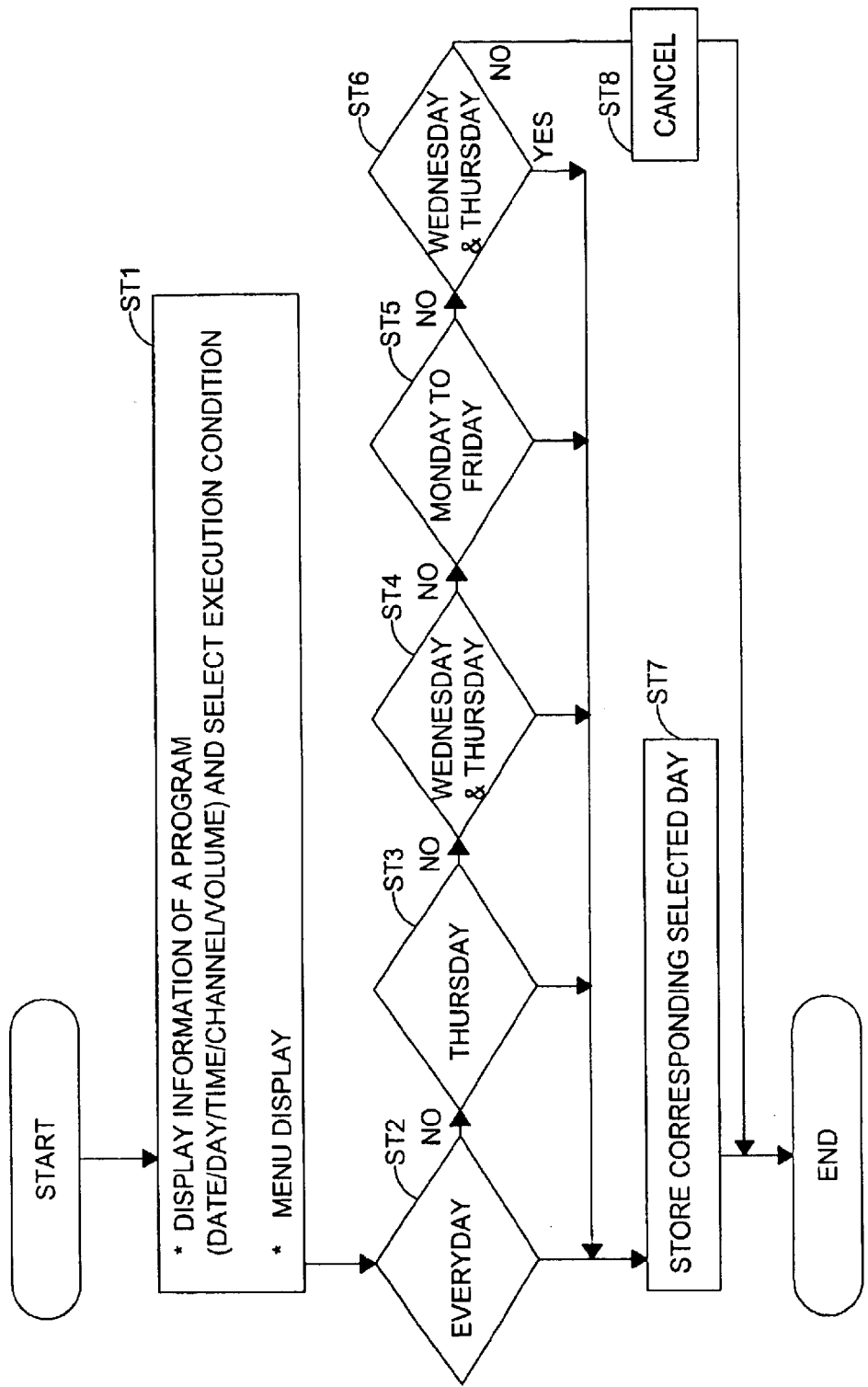
FIG. 5 is a flowchart illustrating a process for executing a usage information setting mode in FIG. 4.

FIG. 5 is a flowchart illustrating a process for executing the usage information setting mode described above with reference to FIG. 4. When the item 'Store' is executed in a main menu of FIG. 7, there is displayed information of a specific TV program such as 'Date', 'Day', 'Time', 'Channel' and 'Volume' and a menu indicating a message 'Execute a desired day', and a sub menu indicating certain day-schedule items in which predetermined days and times are set up (ST1). Then, it is determined whether the specific TV program is shown 'Everyday' (ST2), and if not shown everyday, it is determined that the TV program is shown on 'Thursday' (ST3). Next, if the program is not shown on 'Thursday', it is determined whether the TV program is shown on 'Wednesday' and 'Thursday' (ST4) and then if the program is not shown on 'Wednesday' and 'Thursday', execution moves to block ST5 and it is determined whether the TV program is shown on 'Monday' to 'Friday' (ST5), and if not shown on 'Monday' to 'Friday, block ST5 moves to block ST6 and it is determined whether the TV program is shown on 'Sunday' to 'Saturday' (ST6). In one of the above steps ST2–ST6, if any day-schedule item is selected, the day-schedule item is stored (ST7), while if no day-schedule item corresponds to a desired broadcasting day, the day-schedule item setting mode is cancelled (ST8) and thus day-schedule item setting is completed.

Here, it is noted that the above day-schedule items are only described as an example of the present invention and it is also possible that other types of day-schedule items can be previously established.

Figure 8:
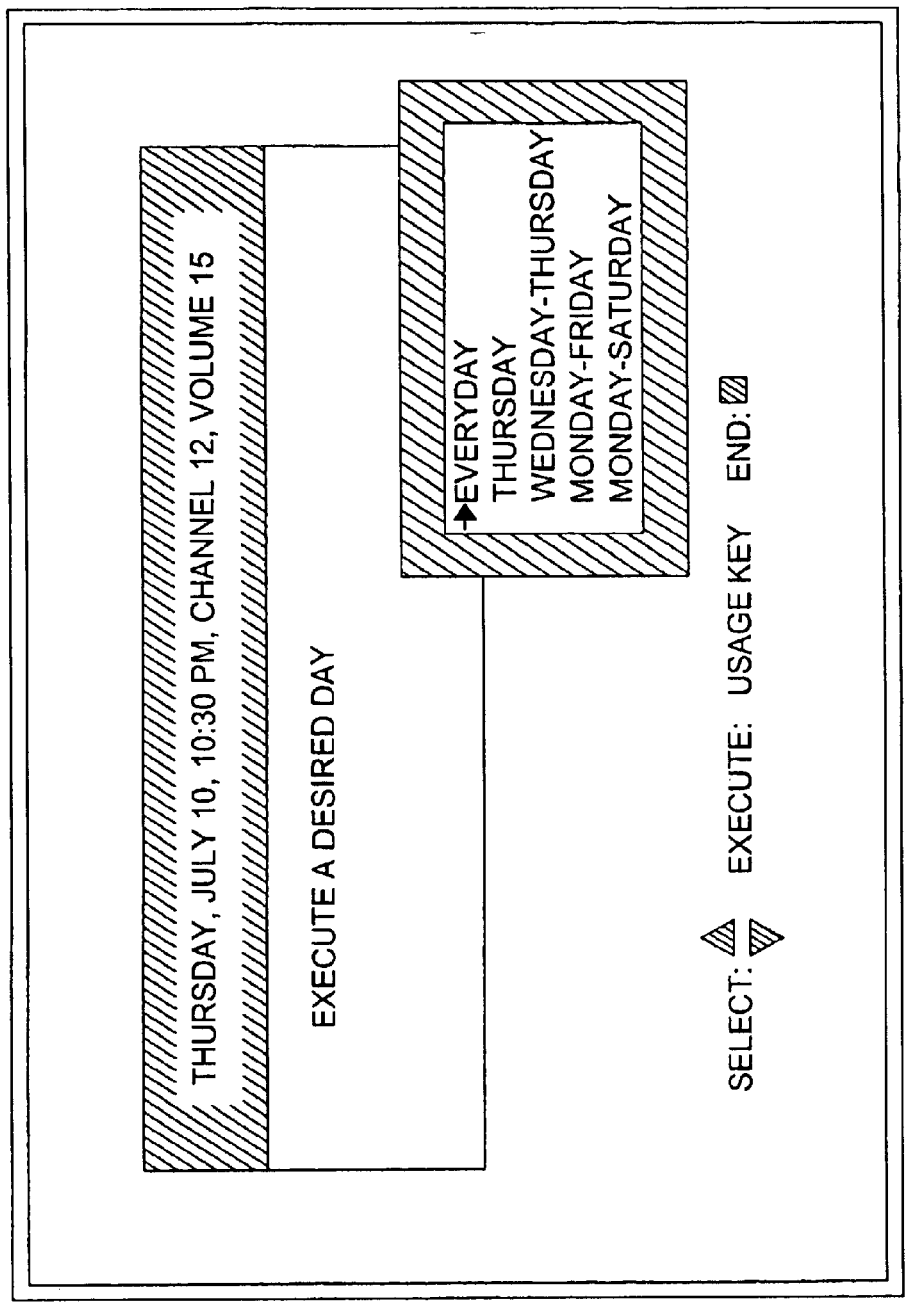
FIG. 8 is a diagram illustrating a menu on-screen displayed on a TV screen in a day-schedule item setting mode.

In FIG. 8, the day-schedule item setting mode which is executed as shown by the flowchart of FIG. 5 is shown on a TV screen. The microcomputer 16 controls the image signal processing unit 14 and the on-screen processing unit 17 which processes the message of 'Execute a desired day' to be displayed on-screen on the main menu, and simultaneously controls the image signal processing unit 14 and the on-screen processing unit 17 which processes the day-schedule items of 'Every', 'Thursday', 'Wednesday and Thursday', 'Monday to Friday' and 'Monday and Saturday' to be displayed on the sub menu. Here, it is noted that the user may select the desired item with the arrow cursor by pressing an upward or downward-selection key provided on the key matrix, and the item selected by the arrow cursor is distinguished from the other items by a specific color highlighting (for example, magenta), the other non-selected items being displayed in another color (for example, green). In such a condition in which the item has been selected, when the user presses the usage key, the selected item is stored and the usage information which has been set is shown on screen as in FIG. 9, while when the end key (for example, the enter key) is pressed, the screen is cleared for thereby completing the usage information setting mode.

Here, by performing the usage information setting for other TV programs with the same method shown in the flowchart of FIG. 5, it is possible for usage information for more than one TV program to be stored.

Figure 9:
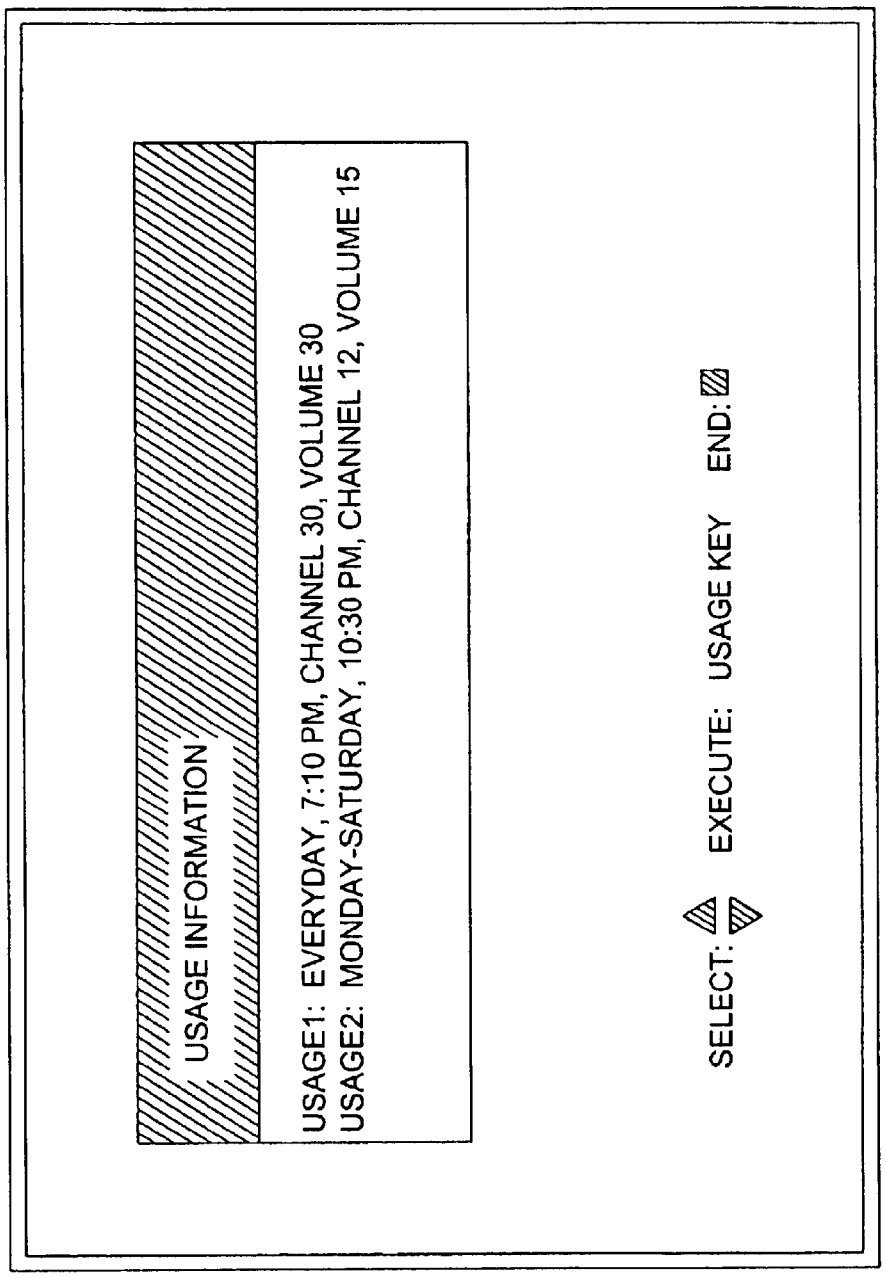
FIG. 9 is a diagram illustrating the usage information which is on-screen displayed on a TV screen.

FIG. 9 illustrates the main menu of the usage information of the TV program which has been set in accordance with the usage information setting method. When the user moves and places the arrow cursor to point to the item 'Confirm' displayed on the main menu shown in FIG. 7 and presses the usage key, or selects one of the day-schedule items shown on the sub menu and presses the usage key to thereby store the selected day-schedule item, the microcomputer 16 controls the image signal processing unit 14 and the on-screen processing unit 17 which processes the usage items (Usage 1, Usage 2, . . . ) which have been set with respect to the TV program to be sequentially displayed on the main menu of the TV screen.

Figure 10:
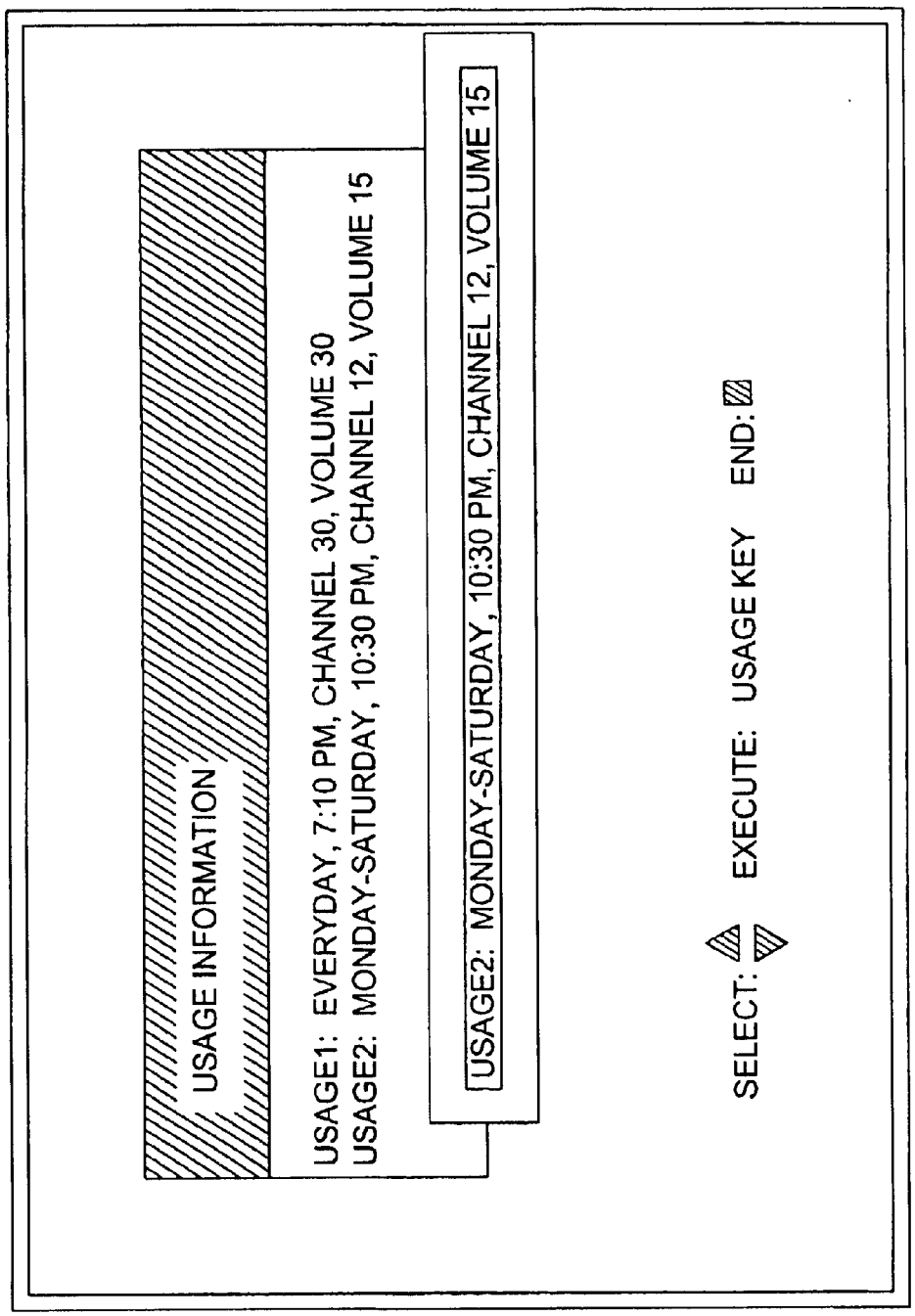
FIG. 10 is a diagram illustrating an on-screen menu of information for correcting the usage information.

Here, when the user selects a desired item by pressing the upward or downward-selection keys, the selected item is displayed in the specific highlight color (for example, magenta) and the other non-selected items are displayed in another color such as green. If the user presses the usage key when the desired items are selected, as shown in FIG. 10, the main and sub menus are displayed on-screen, so that the selected usage items can be corrected. However, when the user presses the end key, the on-screen display is cleared and the usage information setting for the specific TV programs is completed.

As described above, FIG. 10 illustrates the on-screen menu of the TV information for correcting the usage items which have been selected by the user. Here, when the usage key is pressed, the selected usage item is displayed as the sub menu.

When such sub menu is shown, the user may select the stored day-schedule item by pressing the upward or downward-selection keys. Then when the user presses the usage key, the menu for selecting the day-schedule item is displayed on the TV screen and thus the user is able to again select desired usage information by pressing the upward or downward-selection keys, and upon pressing the usage key, the selected usage information is set up and stored, and then the on-screen menu shown in FIG. 10 is displayed.

When the user selects the time usage item by pressing the corresponding direction key and then presses the usage key, a new sub menu (not shown) is displayed, and the user sets up the desired time by using the key matrix. Here, by the same method the usage information of the channel and volume can be set up again.

After setting the usage information again as mentioned above, when the user presses the end key, the usage information is accordingly displayed on the TV screen as shown in FIG. 9. Next, by pressing the end key when the information is displaced as in FIG. 9, the user is able to watch the TV program.

In addition, the method in which the usage information setting is applied according to the present invention may further include a confirmation step for questioning the user whether he/she wishes to watch the specific TV program.

Figure 6:
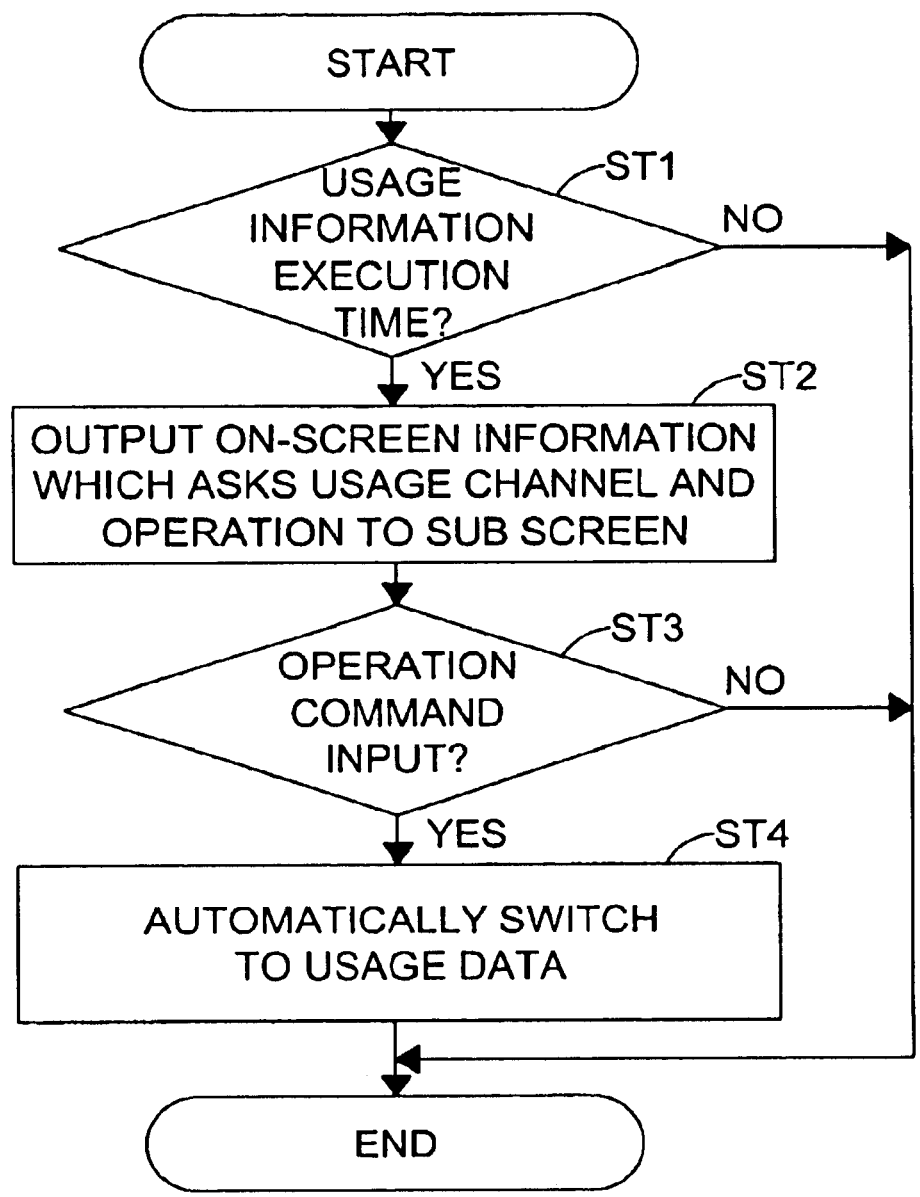
FIG. 6 is a flowchart for executing stored usage information in FIG. 5.
Figure 11:
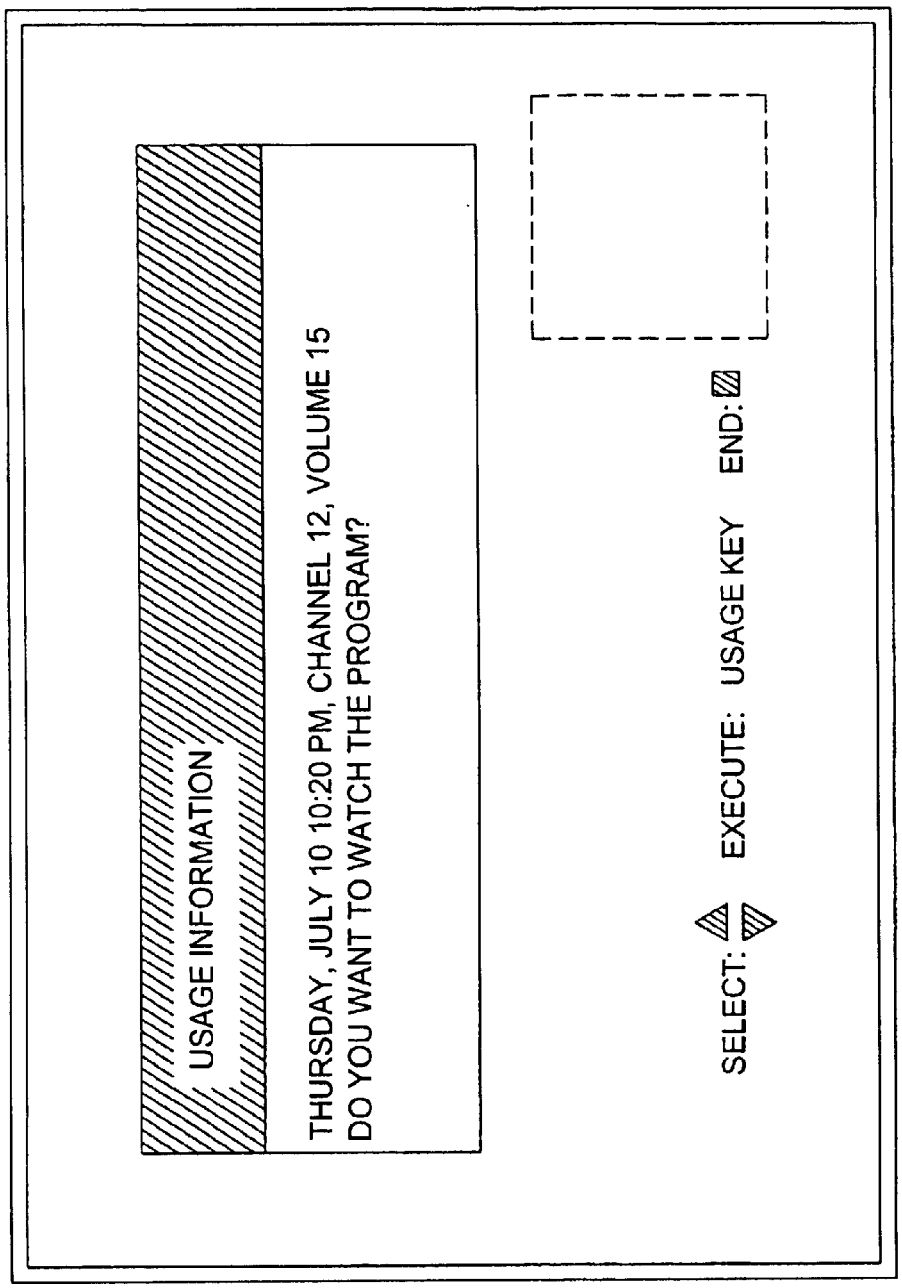
FIG. 11 is a diagram illustrating an on-screen menu of a message which asks execution of the usage information which has been set.

FIG. 6 is a flowchart illustrating the execution of the stored usage information. As shown therein, first the microcomputer 16 determines whether it is the broadcasting time of the specific TV program according to the usage information which has been set (ST1). If it is not the broadcasting time, no operation is performed, but if it is the broadcasting time, the message which asks whether the user wants to watch the TV program is displayed on-screen (ST2). Also, the microcomputer 16 determines whether the user inputs any usage operation command in response to the on-screen message (ST3), and when the microcomputer 16 does not receive any usage operation command, no operation is performed by the microcomputer 16, while upon receiving the operation command, the microcomputer 16 executes the previously stored usage information for the TV program (ST4). Accordingly, when the microcomputer 16 compares the previously stored day (or days) and time information with the broadcasting day and time of the specific TV program and determines that the previously stored information is identical to the current day and time, as shown in FIG. 11, there is displayed an on-screen information message that 'It is the time to watch the TV program: Thur., July, 10., 10:20 PM, Channel 12, Volume 15. Do you want to watch the program ?'

However, when the user presses the upward or downward-selection key, the usage information which is displayed on-screen is cleared and the main menu of FIG. 9 is automatically returned. Here, it is noted that upon pressing the end key in the main menu, the usage information is deleted from the usage items and also the on-screen condition which shows the usage information is cleared.

Here, in the present invention, irrespective of the on/off condition of the TV set, the specific TV program broadcast is received and shown according to the usage information and the microcomputer controls the TV set to display the specific TV program on the main screen after a predetermined time, if no usage operation command is inputted with respect to the on-screen confirmation message asking for confirmation of the watching of the specific TV program which is displayed on the main menu before receiving the TV program.

Further, by determining whether it is the specific TV program broadcasting time according to the usage information, if it is the time of the specific TV program broadcast which has been reserved in the usage information, as shown in FIG. 11, the present invention may further include a step in which the specific stored TV program in the usage information is displayed on the sub screen as in PIP as well as displaying the message which asks for confirmation of the watching of the specific program on-screen. Here, when the user presses the usage key, the specific TV program of which the usage information is displayed on the sub screen is shown by tuning to Channel 12 and setting to a level of the volume 15.

As described above, according to the TV program usage information setting method of the present invention, to show the specific TV program according to the usage information stored in the TV set, the information relative to the TV program can be set up by simply performing the key operation, and the TV program is automatically received and shown at the day and time of the TV program which is set up according to the usage information corresponds to the previously set usage information. Although, in the above-descrived embodiment according to the present invention, the usage information for the TV program such as the day, time, channel and volume is described for example, other information such as sound or image information can be variously selected. Also, the on-screen information indicating the TV program usage information can be shown on the sub screen or the main screen of TV.

It will be apparent to those skilled in the art that various modifications and variations can be made in the TV program usage information setting method and apparatus using the same of the present invention without departing from the spirit or scope of the invention. Thus, it is intended that the present invention cover the modifications and variations of this invention provided they come within the scope of the appended claims and their equivalents.

What is claimed is:

1. A TV program usage information setting method, comprising:
while currently viewing a specific TV program, storing usage information related to a future occurrence of the specific TV program, either periodically or recurringly broadcasted for a TV set, by pressing a usage key; and
automatically receiving and showing the broadcast of the specific IV program in accordance with the stored usage information.

2. The method according to claim 1, wherein the usage information includes items such as broadcasting day and time, channel, volume, and screen size related to the specific TV program.

3. The method according to claim 2, wherein the items of the usage information are displayed on a sub menu.

4. The method according to claim 2, wherein the usage key has functions of storing, confirming and canceling the items of the usage information.

5. The method according to claim 1, wherein in the step of automatically receiving and showing the specific TV program, the specific TV program is received and shown, when the broadcasting day and time among the usage information are identical to the current day and time.

6. The method according to claim 1, further comprising:
displaying the usage information and correcting a corresponding item in order to check or revise previously stored usage information.

7. The method according to claim 1, wherein a specific day (or days) is selected in a day-schedule item of the usage information and the specific TV program related to the usage information is periodically received and shown every selected day (or days) according to the day-schedule item.

8. The method according to claim 1, further comprising:
displaying an on-screen message on a screen of the TV set for asking for confirmation of watching the specific TV program according to the usage information, when it becomes the certain day and time corresponding to the usage information while a TV program is being watched on the TV main screen.

9. The method according to claim 8, further comprising:
displaying the specific TV program which has been previously set on a sub screen in a picture-in-picture type.

10. The method according to claim 8, wherein the message which asks for confirmation of watching the specific TV program is displayed on the main screen or the sub screen.

11. The method according to claim 10, wherein irrespective of the on/off condition of the TV set, the specific TV program is displayed on the main screen after a predetermined time if a user does not press the usage key in response to the message which asks for confirmation of watching the specific TV program, when it becomes the day and time of broadcast of the specific TV program according to the usage information.

12. The method according to claim 1, further comprising:
automatically asking whether a user wants to watch a previously reserved TV program before receiving and showing the reserved TV program in accordance with the stored usage information.

13. An apparatus for setting usage information of a display program, comprising:
- a usage key provided on a remote control or a display device for storing usage information related to a future occurrence of a currently viewed display program by pressing the usage key when the program is shown on the display device;
- a microcomputer for receiving a command signal corresponding to the usage key and controlling the display device in accordance with the command signal;
- an image processing unit for processing image and sound signals to be properly displayed on the display device; and
- an on-screen processing unit for processing the stored usage information in accordance with the command signal.

14. The apparatus according to claim 13, wherein the usage information comprises items such as broadcasting day and time, a channel, volume, and screen size related to the display program.

15. The apparatus according to claim 13, wherein the image processing unit comprising:
- main and sub screen channel selecting units for receiving signals from an antenna and processing image signals to be properly displayed on a cathode ray tube (CRT);
- a picture-in-picture (PIP) processing unit for receiving the image signals supplied from the main and sub screen channel selecting units and performing a PIP process for the image signals; and
- an image signal processing unit for processing to output the image signals outputted from the PIP processing unit to the CRT.

16. The apparatus according to claim 13, wherein the image processing unit displays a message asking whether a user wants to watch a previously reserved TV program before receiving and showing the reserved TV program in accordance with the stored usage information.

17. A method for setting usage information of a display program, comprising:
- storing usage information of a specific program while viewing the specific program on a display device by pressing a usage key that allows a user to store the usage information defining a preset condition for future occurrence of the specific program being viewed on the display device; and
- automatically providing a notification upon satisfying the preset condition.

18. The method according to claim 17, wherein the display includes a cathode ray tube (CWT) and a TV set.

19. The method according to claim 17, wherein the usage information includes items of date, day, time, channel, and volume of a TV program.

20. The method according to claim 17, wherein the notification includes displaying an on-screen message asking for confirmation of whether to watch the specific program.

* * * * *